United States Patent [19]
Taylor et al.

[11] Patent Number: 5,332,613
[45] Date of Patent: Jul. 26, 1994

[54] HIGH PERFORMANCE ELASTOMERIC NONWOVEN FIBROUS WEBS

[75] Inventors: Jack D. Taylor; Jon E. Tinsley, both of Roswell, Ga.

[73] Assignee: Kimberly-Clark Corporation, Neenah, Wis.

[21] Appl. No.: 74,080

[22] Filed: Jun. 9, 1993

[51] Int. Cl.⁵ ............................................. B32B 27/14
[52] U.S. Cl. .................................... 428/152; 428/198; 428/224; 428/283; 428/284; 428/286; 428/287; 428/288; 428/296; 428/297; 428/298; 428/326; 428/903
[58] Field of Search ............... 428/152, 198, 283, 284, 428/286, 287, 296, 297, 298, 326, 903, 288, 224

[56] References Cited

U.S. PATENT DOCUMENTS

| | | | |
|---|---|---|---|
| 3,078,254 | 2/1963 | Zelinski et al. | 260/45.5 |
| 3,177,190 | 4/1965 | Hsieh | 260/94.2 |
| 3,182,052 | 5/1965 | Naylor | 260/94.3 |
| 3,244,644 | 4/1966 | Stiles | 252/466 |
| 3,265,765 | 8/1966 | Holden et al. | 260/876 |
| 3,280,084 | 10/1966 | Zelinski et al. | 260/83.7 |
| 3,322,856 | 5/1967 | Holden et al. | 260/876 |
| 3,449,306 | 6/1969 | Zelinski | 260/83.7 |
| 3,507,934 | 4/1970 | Miser et al. | 260/876 |
| 3,594,452 | 7/1971 | DeLaMare et al. | 260/880 |
| 3,686,365 | 8/1972 | Sequeira | 260/876 B |
| 3,766,301 | 10/1973 | DeLaMare et al. | 260/879 |
| 3,937,760 | 2/1976 | Cole et al. | 260/880 B |
| 4,051,199 | 9/1977 | Udipi et al. | 260/880 R |
| 4,168,286 | 9/1979 | Moczygemba | 525/314 |
| 4,267,096 | 5/1981 | Bussink et al. | 260/40 R |
| 4,299,757 | 11/1981 | Kuribayashi et al. | 260/42.18 |
| 4,564,655 | 1/1986 | Liu | 525/92 |
| 4,628,072 | 12/1986 | Shiraki et al. | 525/57 |
| 4,657,970 | 4/1987 | Shiraki et al. | 525/57 |
| 4,657,971 | 4/1987 | Shiraki et al. | 525/57 |
| 4,663,220 | 5/1987 | Wisneski et al. | 428/221 |
| 4,692,368 | 9/1987 | Taylor et al. | 428/137 |
| 4,707,398 | 11/1987 | Boggs | 428/224 |
| 4,741,949 | 4/1988 | Morman et al. | 428/224 |
| 4,792,584 | 12/1988 | Shiraki et al. | 524/77 |
| 4,820,768 | 4/1989 | Shiraki et al. | 525/92 |
| 4,874,821 | 10/1989 | Agostinis et al. | 525/271 |
| 4,879,170 | 11/1989 | Radwanski et al. | 428/233 |
| 4,927,889 | 5/1990 | Shiraki et al. | 525/285 |
| 5,169,706 | 12/1992 | Collier et al. | 428/152 |

FOREIGN PATENT DOCUMENTS

| | | |
|---|---|---|
| 0457905A1 | 11/1991 | European Pat. Off. . |
| 2003891B | 3/1982 | United Kingdom . |
| 2207679A | 2/1989 | United Kingdom . |

Primary Examiner—James J. Bell
Attorney, Agent, or Firm—Karl V. Sidor; James B. Robinson

[57] ABSTRACT

Disclosed is an elastic nonwoven web containing a coherent matrix of fibers formed from an extrudable blend composed of an elastomeric A-B-A-B tetrablock copolymer where A is a thermoplastic polymer block and where B is an isoprene monomer unit hydrogenated to substantially a poly(ethylene-propylene) monomer unit. The elastic nonwoven web adapted to have an elastic modulus of less than about 1.25 which is locally constant during elongation of the web up to about 250 percent. The elastic nonwoven web may also include at least one type of nonelastic fibers and/or particulate materials distributed within or on the matrix of elastomeric fibers. The elastic nonwoven web may be incorporated into a multilayer material and/or may be a component of a composite elastic material in which the elastic web is joined to a gatherable layer at spaced apart locations so that the gatherable layer is gathered between the spaced-apart locations.

24 Claims, 7 Drawing Sheets

HIGH PERFORMANCE ELASTOMERIC NONWOVEN FIBROUS WEBS

FIELD OF THE INVENTION

The present invention is generally directed to nonwoven webs and composite materials incorporating such webs. More particularly, the invention is directed to nonwoven webs of elastomeric fibers and elastic composite materials incorporating such webs.

BACKGROUND OF THE INVENTION

In the field of nonwoven materials, there has been a continuing need for materials having high degree of flexibility and elasticity and which may be manufactured at a low cost. In particular, there is a need for an elastic material having a low elastic modulus and which retains its low elastic modulus during elongation to provide a soft, gentle elasticity. This need has persisted in spite of the fact that such materials could readily be utilized in the manufacture of a wide variety of garments of both the disposable type, such as disposable diapers, or the durable type, such as pants, dresses, blouses and sporting wear. An elastic material having a low elastic modulus and which retains its low elastic modulus during elongation would be particularly desirable for use in disposable diapers and other personal care products because articles manufactured from such materials are able to softly and gently conform to the body of a wearer and repeatedly extend and retract without creating uncomfortable pressure against the skin.

Elastic nonwoven webs of fibers have been formed from blends of styrene-poly(ethylene-butylene)-styrene elastomeric block copolymers with other materials such as, for example, polyolefins and tackifying resins to improve processing and/or bonding. While improving the processing and/or bonding properties of the elastic webs, such additives may, in certain situations, have an adverse affect on the elastic properties of the material. For example, elastic block copolymers blended with large amounts of a polyolefin and/or a low elastic modulus hydrocarbon resin may have a relatively high elastic modulus and/or may be unable to retain a desirably low elastic modulus during elongation.

DEFINITIONS

The term "elastic" is used herein to mean any material which, upon application of a biasing force, is stretchable, that is, elongatable, to a stretched, biased length which is at least about 160 percent of its relaxed unbiased length, and which, will recover at least 55 percent of its elongation upon release of the stretching, elongating force. A hypothetical example would be a one (1) inch sample of a material which is elongatable to at least 1.60 inches and which, upon being elongated to 1.60 inches and released, will recover to a length of not more than 1.27 inches. Many elastic materials may be elongated by much more than 60 percent (i.e., much more than 160 percent of their relaxed length), for example, elongated 100 percent or more, and many of these will recover to substantially their initial relaxed length, for example, to within 105 percent of their initial relaxed length, upon release of the stretching force.

As used herein, the term "nonelastic" refers to any material which does not fall within the definition of "elastic," above.

As used herein, the terms "recover" and "recovery" refer to a contraction of a stretched material upon termination of a biasing force following stretching of the material by application of the biasing force. For example, if a material having a relaxed, unbiased length of one (1) inch is elongated 50 percent by stretching to a length of one and one half (1.5) inches the material would be elongated 50 percent (0.5 inch) and would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its one-half (0.5) inch elongation. Recovery may be expressed as [(maximum stretch length−final sample length)/(maximum stretch length−initial sample length)]×100.

As used herein, the term "elastic modulus" means the resistance to elongation of a substantially flat, relatively thin elastic sheet material. Elastic modulus is the tensile load of an elastic material at a specified strain (i.e., elongation) for a given width of material divided by the basis weight of the material in an unelongated condition. Elastic modulus of a nonwoven fibrous web is typically determined in one direction (e.g., machine direction) at a specified strain (i.e., elongation). Elastic materials having low values for elastic modulus are desirable in certain applications where a soft, gentle elasticity is desired. For a specified sample width, elastic modulus is reported in units of force divided by the units of basis weight of the elastic material. This provides a measure of force per unit area and is accomplished by reporting the thickness of the elastic component in terms of its basis weight rather than as an actual caliper measurement. For example, reported units may be grams $_{force}$ (for a specific sample width)/grams per square meter. Unless specified otherwise, all elastic modulus data is the elastic modulus reported at 100 percent strain (i.e., elongation) for the first extension of a three (3) inch wide sample having a four (4) inch gauge length conducted at an elongation rate of about 10 inches per minute.

As used herein, the expression "locally constant elastic modulus" means that the rate of change in elastic modulus over a range of elongations is constant. The local rate of change in elastic modulus corresponds to a portion of the slope of a modulus versus elongation curve measured during elongation of an elastic material at a specified rate of strain (i.e., elongation). This provides a measure of the change in resistance to elongation as a material is stretched. Elastic modulus of a nonwoven fibrous web is typically determined in one direction (e.g., machine direction). Elastic materials having a locally constant elastic modulus are desirable in certain applications. For example, an elastic material having a relatively low elastic modulus which remains generally constant and has a low level of increase may be useful in applications where a soft, gentle uniform elasticity is desired. Generally speaking, a lower slope of the stress versus strain curve indicates a more uniform level of elastic tension during elongation. Unless specified otherwise, all of the data pertaining to the rate of change in elastic modulus during elongation is reported for the first extension of a three (3) inch wide sample having a four (4) inch gauge length during elongation of the sample in the machine direction from about 100 percent extension to about 250 percent extension at an elongation rate of about 10 inches per minute.

As used herein, the term "nonwoven web" means a web having a structure of individual fibers or threads which are interlaid, but not in an identifiable, repeating manner. Nonwoven webs have been, in the past, formed by a variety of processes such as, for example, melt-blowing processes, spunbonding processes and bonded carded web processes.

As used herein, the term "spunbonded web" refers to a web of small diameter fibers and/or filaments which are formed by extruding a molten thermoplastic material as filaments from a plurality of fine, usually circular, capillaries in a spinnerette with the diameter of the extruded filaments then being rapidly reduced, for example, by non-eductive or eductive fluid-drawing or other well known spunbonding mechanisms. The production of spunbonded nonwoven webs is illustrated in patents such as Appel, et al., U.S. Pat. No. 4,340,563; Dorschner et al., U.S. Pat. No. 3,692,618; Kinney, U.S. Pat. Nos. 3,338,992 and 3,341,394; Levy, U.S. Pat. No. 3,276,944; Peterson, U.S. Pat. No. 3,502,538; Hartman, U.S. Pat. No. 3,502,763; Dobo et al., U.S. Pat. No. 3,542,615; and Harmon, Canadian Pat. No. 803,714.

As used herein, the term "meltblown fibers" means fibers formed by extruding a molten thermoplastic material through a plurality of fine, usually circular, die capillaries as molten threads or filaments into a high-velocity gas (e.g. air) stream which attenuates the filaments of molten thermoplastic material to reduce their diameters, which may be to microfiber diameter. Thereafter, the meltblown fibers are carried by the high-velocity gas stream and are deposited on a collecting surface to form a web of randomly disbursed meltblown fibers. The meltblown process is well-known and is described in various patents and publications, including NRL Report 4364, "Manufacture of Super-Fine Organic Fibers" by V.A. Wendt, E.L. Boone, and C.D. Fluharty; NRL Report 5265, "An Improved device for the Formation of Super-Fine Thermoplastic Fibers" by K.D. Lawrence, R.T. Lukas, and J.A. Young; and U.S. Pat. No. 3,849,241, issued Nov. 19, 1974, to Buntin, et al.

As used herein, the term "microfibers" means small diameter fibers having an average diameter not greater than about 100 microns, for example, having a diameter of from about 0.5 microns to about 50 microns, more specifically microfibers may also have an average diameter of from about 1 micron to about 20 microns. Microfibers having an average diameter of about 3 microns or less are commonly referred to as ultra-fine microfibers. A description of an exemplary process of making ultra-fine microfibers may be found in, for example, U.S. patent application Ser. No. 779,929, entitled "A Nonwoven Web With Improved Barrier Properties" filed Nov. 26, 1991, incorporated herein by reference in its entirety.

As used herein, the term "average molecular weight" refers to the number average molecular weight of a polymer or polymer fragment as determined by gel permeation chromatography. Molecular weight information for elastomeric block copolymers (e.g. styrene-poly(ethylene-propylene)-styrene-poly(ethylene-propylene) block copolymer) was obtained from the Shell Chemical Company.

As used herein, the term "melt flow rate" refers to the amount of material under a pressure or load that flows through an orifice at a given temperature over a measured period of time. The melt flow rate is expressed in units of weight divided by time (i.e., grams/10 minutes). Except where otherwise indicated, the melt flow rate was determined by measuring the weight of a polymer under a 2,160 kg load that flowed through an orifice diameter of for example, 10 minutes at a specified temperature such as, 2.0995±0.0051 mm during a measured time period such as, for example, 10 minutes at a specified temperature such as, for example 190° C. as determined in accordance with ASTM Test Method D1238-82, "Standard Test Method for Flow Rates of Thermoplastic By Extrusion Plastometer," using a Model VE 4-78 Extrusion Plastometer (Tinius Olsen Testing Machine Co., Willow Grove, Pennsylvania).

As used herein, the term "superabsorbent" refers to absorbent materials capable of absorbing at least 10 grams of aqueous liquid (e.g. distilled water) per gram of absorbent material while immersed in the liquid for 4 hours, and holding substantially all of the absorbed liquid while under a compression force of up to about 1.5 psi.

As used herein, the term "composite elastic material" refers to a multilayer material having at least one elastic layer joined to at least one gatherable layer at least at two locations in which the gatherable layer is gathered between the locations where it is joined to the elastic layer. A composite elastic material may be stretched to the extent that the nonelastic material gathered between the bond locations allows the elastic material to elongate. This type of composite elastic material is disclosed, for example, by U.S. Pat. No. 4,720,415 to Vander Wielen et al., issued Jan. 19, 1988, which is hereby incorporated by reference.

As used herein, the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, particulates and materials added to enhance processability of the composition.

As used herein, the term "compatible" refers to the relationship of one polymeric material to another with respect to the extrusion process and extrudates. To be compatible, two different polymeric materials should, for example, be capable of blending into a substantially homogeneous miscible mixture.

SUMMARY OF THE INVENTION

The present invention addresses the above described needs by providing an elastic nonwoven web containing a coherent matrix of fibers formed from an extrudable blend composed of an elastomeric A-B-A-B tetrablock copolymer where A is a thermoplastic polymer block and where B is an isoprene monomer unit hydrogenated to substantially a poly(ethylene-propylene) monomer unit; so that the web is adapted to have an elastic modulus (at 100 percent elongation) of less than about 1.25. Desirably, the web is adapted to have an elastic modulus (at 100 percent lelongation) of less than about 1. For example, the web may be adapted to have an elastic modulus (at 100 percent elongation) of less than about 0.85.

According to the present invention, the elastic modulus is locally constant during elongation of the elastic nonwoven web during elongation of the web up to about 250 percent. For example, the elastic modulus is locally constant during elongation of the elastic nonwoven web from about 25 percent to about 250 percent. Desirably, the elastic modulus may be locally constant during elongation of the elastic nonwoven web during elongation of the web to greater than 250 percent elongation.

In one aspect of the present invention, the elastic nonwoven web is formed from an elastomeric A-B-A-B tetrablock copolymer that has the formula:

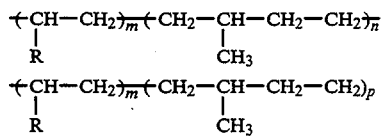

in which m is an integer from about 40 to 75; and n is an integer from about 500 to 1000; p is an integer from about 75 to 125; and R is a phenyl group.

The elastomeric polymer may be blended with other materials to form an extrudable blend. For example, an extrudable blend which can be used to form the elastic nonwoven web may contain a tackifying resin. Exemplary tackifying resins include hydrogenated hydrocarbon resins and/or terpene hydrocarbon resins. The extrudable blend may also contain a polyolefin. For example, the extrudable blend may contain polyethylene, polypropylene, polybutylene, polyethylene copolymers, polypropylene copolymers, polybutylene copolymers and mixtures thereof. In another aspect of the invention, the extrudable blend may contain an extending oil. The extending oil may be a mineral oil such as, for example, a white mineral oil.

Generally speaking, when an extrudable blend used to form the elastic nonwoven web contains components in addition to the elastomeric polymer, the blend may be composed of from about 50 to about 80 percent, by weight, of the elastomeric A-B-A-B tetrablock copolymer, from about 15 to about 28 percent, by weight, of a tackifying resin, from about 3 to about 23 percent, by weight, of a polyolefin, and from about 0 to about 15 percent, by weight, of an extending oil.

The elastic nonwoven web of fibers may be a web of meltblown fibers or spunbonded fibers. The meltblown fibers may be microfibers. The elastic nonwoven web may also include at least one type of nonelastic fibers and/or particulate materials, for example nonelastic microfibers, which are distributed within or upon the matrix (i.e., an elastic coformed web). The nonelastic fibers and/or particulate materials may be generally uniformly distributed throughout the matrix. Random and gradient distributions are also envisioned.

The nonelastic fibers, which may be microfibers, may be selected from the group including polyester fibers, polyamide fibers, glass fibers, polyolefin fibers, cellulosic derived fibers, multi-component fibers, natural fibers or electrically conductive fibers or blends of two or more nonelastic fibers. If the nonelastic fibers are natural fibers, the natural fibers may be selected from, for example, cotton fibers, wool fibers and silk fibers. If the nonelastic fibers are polyolefin fibers, the polyolefin fibers may be selected from, for example, polyethylene fibers or polypropylene fibers. If the nonelastic fibers are cellulosic derived fibers, the cellulosic derived fibers may be selected from, for example, rayon fibers or wood fibers. Exemplary wood fibers are wood pulp fibers. If the nonelastic fibers are polyamide fibers, the polyamide fibers may be nylon fibers. If the nonelastic fibers are multi-component fibers, the multi-component fibers may be sheath-core fibers or side-by-side fibers. The nonelastic fibers may be absorbent or superabsorbent fibers.

If nonelastic fibers are present in the elastic nonwoven web, the elastic nonwoven web may generally include from about 20 percent, by weight, to about 99 percent, by weight, of fibers formed from the extrudable blend containing an elastomeric tetrablock copolymer and from about 1 percent, by weight to 80 percent, by weight, of the nonelastic fibers. For example, the elastic nonwoven web may include from about 50 percent, by weight to about 99 percent, by weight, of fibers formed from the extrudable blend containing an elastomeric tetrablock copolymer and from about 1 percent, by weight, to about 50 percent, by weight, of the nonelastic fibers. In certain applications, particulate materials may be substituted for the nonelastic fibers. Alternatively, the elastic nonwoven web may have both nonelastic fibers and particulate materials incorporated into the matrix of elastomeric tetrablock copolymer fibers. In such a three component system, the elastic nonwoven web may contain from about 50 percent, by weight, to about 98 percent, by weight, of fibers formed from the extrudable blend containing an elastomeric tetrablock copolymer, from about 1 percent, by weight, to about 49 percent, by weight, of nonelastic fibers and from about 1 percent, by weight, to about 49 percent, by weight, of particulate materials. Exemplary particulate materials are activated charcoal and superabsorbent materials such as, for example, hydrocolloids.

According to the present invention, the elastic nonwoven web may be incorporated into a multilayer material. For example, the elastic nonwoven web may be joined with at least one other textile fabric, knit fabric, nonwoven fabric, film or combination thereof. As a further example, the elastic nonwoven web and/or the elastic coformed web may be a component of a composite elastic material in which the elastic web is joined to a gatherable layer at spaced apart locations so that the gatherable layer is gathered between the spaced-apart locations.

The gatherable layer may be, for example, a web of spunbonded fibers, a web of meltblown fibers, a bonded carded web of fibers, a multi-layer material including at least one of the webs of spunbonded fibers, meltblown fibers, and a bonded carded web of fibers. Alternatively, and/or additionally, the gatherable layer may be a coformed web composed of a mixture of fibers and one or more other materials such as, for example, wood pulp, staple fibers, particulates and super-absorbent materials.

DETAILED DESCRIPTION OF THE INVENTION

The elastic nonwoven web may be formed by a variety of extrusion techniques. One particularly useful extrusion technique is to form a fibrous elastic nonwoven web by meltblowing.

Figure 1:
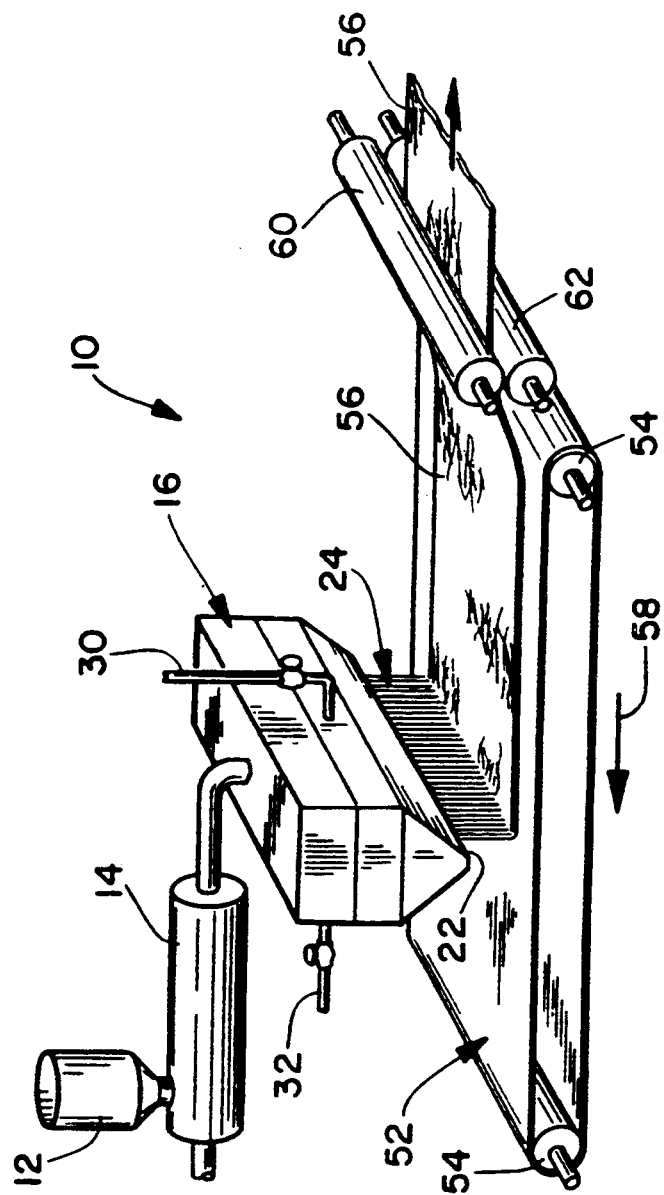
FIG. 1 is a schematic illustration of an apparatus, including a meltblowing die, which may be utilized to form the elastic nonwoven web of the present invention.

Turning now to the FIGURES and, in particular, to FIG. 1, wherein like reference numerals represent the same or equivalent structure, it can be seen that an apparatus for forming the elastic nonwoven web of the present invention is schematically generally represented by reference numeral 10. In forming the elastic nonwoven web of the present invention pellets or chips, etc.(not shown) of a blend material are introduced into a pellet hopper 12 of an extruder 14.

The pellets or chips are composed of an elastomeric A-B-A-B tetrablock copolymer where A is a thermoplastic polymer block and where B is an isoprene monomer hydrogenated to substantially a poly(ethylene-propylene) monomer unit. Generally speaking, this extrudable composition is extruded into elastic nonwoven webs of the invention. The extrudable composition contains (1) an elastic styrene-poly(ethylene-propylene)-styrene-poly(ethylene-propylene)(SEP-SEP) block copolymer or (2) a mixture of styrene-poly(ethylene-propylene)-styrene-poly(ethylene-propylene)(SEPSEP) and styrene-poly(ethylene-butylene)-styrene (SEBS) elastomeric block copolymers. The elastomeric polymer component may be blended with a tackifying resin. The blend may further include a polyolefin and an extending oil. The styrene-poly (ethylene-propylene)-styrene-poly (ethylene-propylene)(SEPSEP) thermoplastic elastomeric block copolymer component has a general formula of:

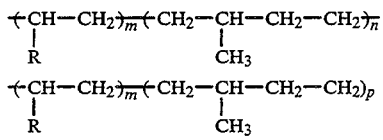

in which m is an integer from about 40 to 75; and n is an integer from about 500 to 1000; p is an integer from about 75 to 125; and R is a phenyl group. If m, n and p are too low, the polymer will be too fluid and will lack sufficient strength for useful elastomeric nonwoven fibrous webs. If m, n and p are too high, the polymer will be difficult to process into a nonwoven fibrous web.

In the above formula, the midblock is an isoprene monomer hydrogenated to substantially a poly(ethylene-propylene) monomer unit shown with a 1,4 orientation. Generally speaking, for applications in severe processing environments where heat and pressure are near the degradation points of the polymer (e.g., melt-spinning or meltblowing process conditions), the level of saturation achieved by hydrogenation is desirably greater than about 95%. For example, the level of saturation achieved by hydrogenation is desirably greater than about 98%. More desirably, the level of saturation achieved by hydrogenation is greater than about 99%. Minor amounts of unsaturation are acceptable. Such unsaturation may produce midblocks with very minor amounts of amylene. With respect to the microstructure of the linear midblock polymer, the midblock may have a minor amount of 1,2 or a 3,4 orientation. However, it is desirable that the midblock have substantially a 1,4 orientation. For example, the midblock may have a 1,4 orientation of greater than about 90%. Desirably, the midblock may have a 1,4 orientation of greater than about 95%.

The elastomeric A-B-A-B tetrablock copolymer may have an average molecular weight ranging from about 48,000 to about 94,000. The weight ratio of polystyrene endblocks to poly(ethylene-propylene) midblocks and endblocks may range from about 10:90 to about 25:75. If the styrene ratio is too low, the polymer will have poor strength and will produce relatively weak nonwoven fibrous webs. If the styrene ratio is too high, the polymer will have a relatively large amount of molecular orientation and will produce nonwoven fibrous webs that are relatively stiff with poor tactile properties.

For example, particularly useful values for m range from about 48 to about 87 resulting in a polystyrene block having an average molecular weight about 5,000 to about 10,000. Desirably, m will be about 57 resulting in a polystyrene block having an average molecular weight about 6,000. Particularly useful values for n range from about 570 to about 1000 resulting in a poly(ethylene-propylene) midblock having an average molecular weight from about 40,000 to about 70,000. Desirably, n will be about 614 resulting in a poly(ethylene-propylene) midblock having an average molecular weight about 43,000. Particularly useful values for p range from about 100 to about 125 resulting in a poly(ethylene-propylene) endblock having an average molecular weight from about 7000 to about 8750. Desirably, p will be about 114 resulting in a poly(ethylene-propylene) endblock having an average molecular weight about 8,000.

Generally speaking, the total molecular weight of the elastomeric A-B-A-B tetrablock copolymer may be, for example, from about 50,000 to about 90,000. Such rubbery block copolymers may have an average molecular weight ratio of polystyrene endblocks to poly(ethylene-propylene) midblocks from about 10:90 to about 25:75. For example, one styrene-poly(ethylene-propylene)-styrene-poly(ethylene-propylene) (SEPSEP) elastomeric block copolymer useful in the present invention is available from the Shell Chemical Company and has an average molecular weight of about 63,000 with polystyrene blocks each having an average molecular weight of about 6000; a poly(ethylene-propylene) midblock having an average molecular weight of about 43,000; a poly(ethylene-propylene) endblock having an average molecular weight of about 8,000; and an average molecular weight ratio of polystyrene blocks to poly(ethylene-propylene) blocks of about 23.5:76.5. The transition between one block and another block may be clean or may have a tapered-block configuration.

In some situations, it may be desirable to blend the elastomeric A-B-A-B tetrablock copolymer with another elastomeric block copolymer such as, for example, a styrene-poly(ethylene-butylene)-styrene block copolymer to form an elastomeric block copolymer mixture. Such a mixture may be used in the present invention in place of a substantially pure elastomeric A-B-A-B tetrablock copolymer and still achieve the desired stress-relaxation properties. Useful elastomeric block copolymer mixtures may contain up to about 60 parts by weight of styrene-poly(ethylene-butylene)-styrene elastomeric block copolymer per 100 parts of elastomeric A-B-A-B tetrablock copolymer and down to about 40 parts by weight of elastomeric A-B-A-B tetrablock copolymer per 100 parts of styrene-poly(ethylene-butylene)-styrene elastomeric block copolymer. One useful styrene-poly(ethylene-butylene)-styrene elastomeric block copolymer has an average molecular weight of about 50,000 with polystyrene endblocks having an average molecular weight of about 7200 and an average molecular weight ratio of polystyrene endblocks to poly(ethylene-butylene) midblocks of about 30:70. Such a styrene-poly(ethylene-butylene)-styrene block copolymer may be obtained from the Shell Chemical Company under the trade designation KRATON ® G-1657.

The elastomeric A-B-A-B tetrablock copolymer and other elastomeric block copolymers which may be combined to create extrudable blends may have configurations that differ from conventional linear block configurations. For example, it is contemplated that the elastomeric A-B-A-B tetrablock copolymer may have a branched configuration. It is also contemplated that the tetrablock copolymer may be blended with other elastomeric block copolymers which may be different than conventional linear block configurations. For example, the other elastomeric block copolymers which may be used in a blend may have branched, radial or star configurations.

Various tackifying resins may be used in the present invention. In particular, the purpose of the tackifying resin is to provide an elastic web that can act as a pressure sensitive adhesive, e.g., to bond the elastic sheet to a gatherable web. Of course, various tackifying resins are known, and are discussed, e.g., in U.S. Pat. Nos. 4,789,699, 4,294,936 and 3,783,072, the contents of which, with respect to the tackifier resins, are incorporated herein by reference. Any tackifier resin can be used which is compatible with the elastic polymer and the polyolefin, and can withstand the high processing (e.g., extrusion) temperatures. Generally, hydrogenated hydrocarbon resins are preferred tackifying resins, because of their better temperature stability. In the following paragraphs are disclosed information on three specific tackifying resins, two of which (REGALREZ ® and ARKON ®P series tackifiers) are examples of hydrogenated hydrocarbon resins, and the ZONATAC ®501 lite being a terpene hydrocarbon. Of course, while the three tackifying resins are specifically discussed, the present invention is not limited to use of such three tackifying resins, and other tackifying resins which are compatible with the other components of the composition and can withstand the high processing temperatures, and can achieve the objectives of the present invention, can also be used.

REGALREZ ® hydrocarbon resins, a product of Hercules, Incorporated, are fully hydrogenated α-methyl styrene-type low molecular weight hydrocarbon resins, produced by polymerization and hydrogenation of pure monomer hydrocarbon feed stocks. Grades 1094, 3102, 6108 and 1126 are highly stable, light-colored low molecular weight, nonpolar resins suggested for use in plastics modification, adhesives, coatings, sealants and caulks. The resins are compatible with a wide variety of oils, waxes, alkyds, plastics and elastomers and are soluble in common organic solvents.

ZONATAC ®501 lite resin, a product of Arizona Chemical Co., has a softening point of 105° C., a Gardner color 1963 (50% in heptane) of 1—and a Gardener color neat (pure) (50% in heptane); APHA color=70) of water white, a specific gravity (25°/25° C.) of 1.02 and a flash point (closed cup, ° F.) of 480° F.

The polyolefin which may be utilized in the extrudable composition must be one which, when blended with the elastic block copolymer or a mixture of elastomeric block copolymers and subjected to an appropriate combination of elevated pressure and elevated temperature conditions, is extrudable, in blended form, with the elastomeric block copolymer or mixture of elastomeric block copolymers. In particular, useful polyolefin materials include polyethylene, polypropylene and polybutylene, including polyethylene copolymers, polypropylene copolymers and polybutylene copolymers. Blends of two or more of the polyolefins may be utilized.

One particular polyethylene may be obtained from U.S.I. Chemical Company under the trade designation Petrothene NA 601 (also referred to herein as PE NA 601). Information obtained from U.S.I. Chemical Company states that PE NA 601 is a low molecular weight, low density polyethylene for application in the areas of hot melt adhesives and coatings. U.S.I. has also stated that PE NA 601 has the following nominal values: (1) a Brookfield viscosity, cP at 150 degrees Centigrade of 8,500 and at 190 degrees Centigrade of 3,300 when measured in accordance with ASTM D 3236; (2) a density of 0.903 grams per cubic centimeter when measured in accordance with ASTM D 1505; (3) an equivalent Melt index of 2,000 grams per 10 minutes when measured in accordance with ASTM D 1238; (4) a ring and ball softening point of 102 degrees Centigrade when measured in accordance with ASTM E 28; (5) a tensile strength of 850 pounds per square inch when measured in accordance with ASTM D 638; (6) an elongation of 90% when measured in accordance with ASTM D 638; (7) a modulus of rigidity, $T_f(45,000)$ of −34 degrees Centigrade; and (8) a penetration hardness (tenths of mm) at 77 degrees Fahrenheit of 3.6.

Of course, the present invention is not limited to use of such specific polyolefins described herein. In this regard, note the polyolefins as described in U.S. Pat. Nos. 4,663,220 and 4,789,699, the contents of which are incorporated herein by reference. More generally, and noting the specific purpose of the polyolefin, as described in the U.S. Pat. No. 4,663,220, various polyolefins which can be utilized in the present invention can easily be determined.

Extending oils which may be used in the blend should be capable of being melt-processed with the other components of the blend without degrading. An exemplary extending oil is a white mineral oil available under the trade designation Drakeol 34 from the Pennzoil Company. Drakeol 34 has a specific gravity of 0.864–0.878 at 60° F., a flash point 460° F. and viscosity of 370–420 SUS at 100° F. (other physical properties). Suitable vegetable oils, animal oils and their derivatives may also be used as the extending oil.

The components of the composition of the present invention can be utilized over broad ranges of the amounts of each component. As a guide, the best results have been obtained when utilizing a three-component blend of a styrene-poly(ethylene-propylene)-styrene-poly(ethylene-propylene) (SEPSEP) elastomeric block copolymer, a tackifier and an extending oil. The following ranges, as shown in Table 1, are exemplary. It is emphasized that these ranges are merely illustrative, serving as a guide for amounts of the various components in the composition.

TABLE 1

| | Weight % |
|---|---|
| SEPSEP elastomeric block copolymer or mixture of SEPSEP and SEBS elastomeric block copolymers | 50–80 |
| Tackifier | 12–30 |
| Polyolefin | 0–15 |
| Extending Oil | 0–9 |

Figure 2:
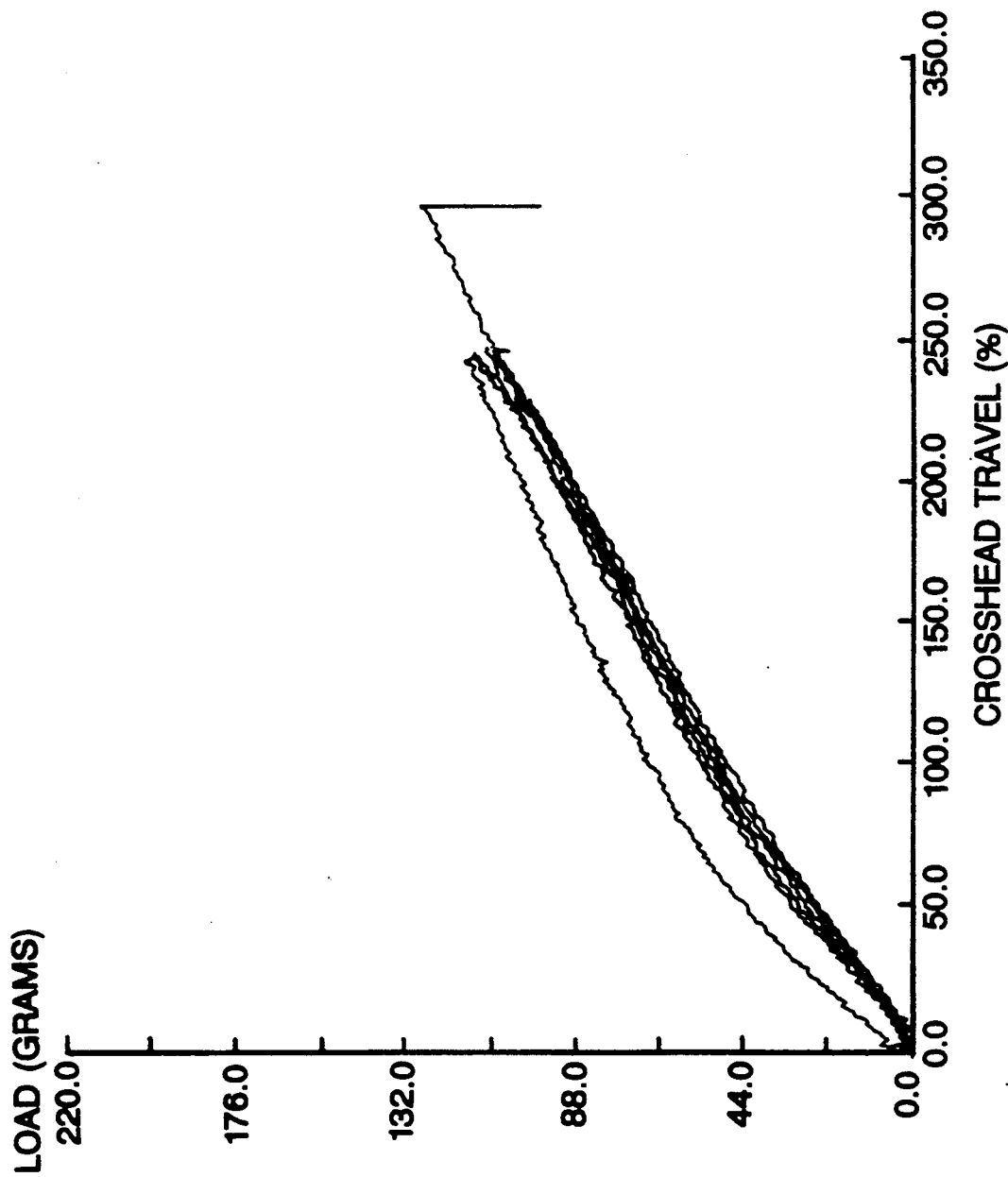
FIG. 2 is an exemplary stress-strain curve for an elastic nonwoven web of meltblown fibers formed from a styrene-poly(ethylene-propylene)-styrene-poly(ethylene-propylene) thermoplastic elastomeric block copolymer blend.
Figure 3:
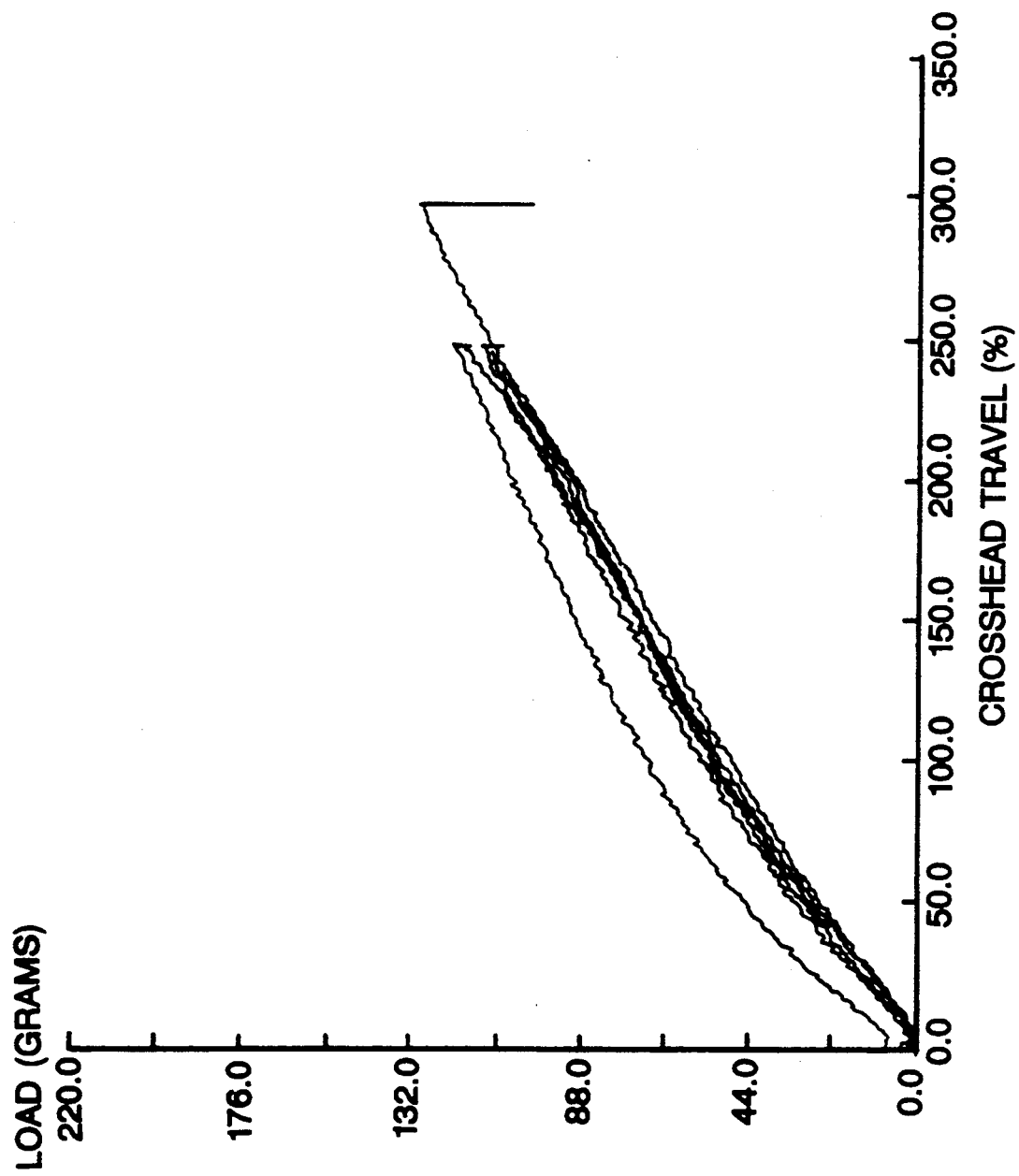
FIG. 3 is an exemplary stress-strain curve for an elastic nonwoven web of meltblown fibers formed from a styrene-poly(ethylene-propylene)-styrene-poly(ethylene-propylene) thermoplastic elastomeric block copolymer blend.
Figure 4:
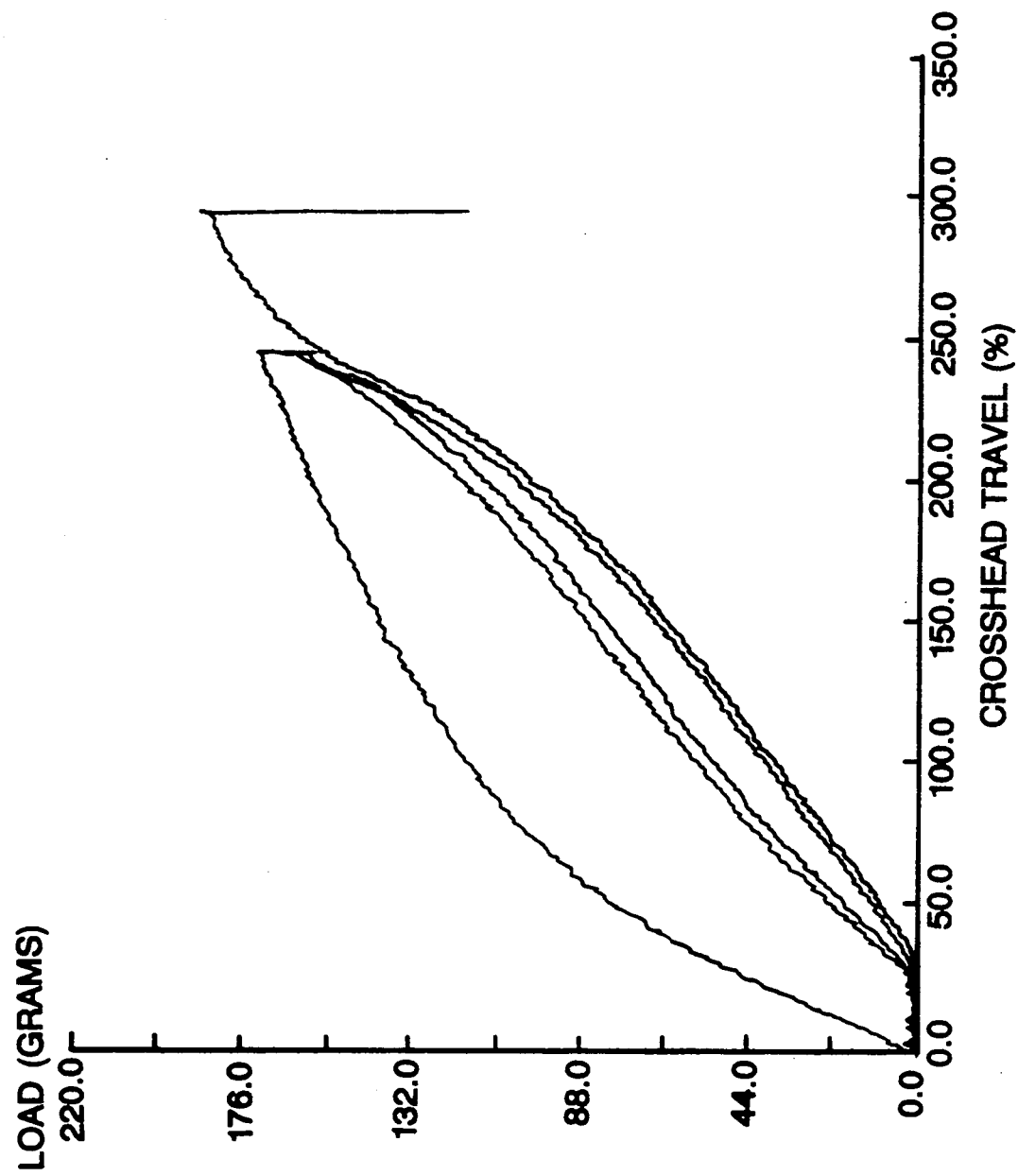
FIG. 4 is an exemplary stress-strain curve for an elastic nonwoven web of meltblown fibers formed from a styrene-poly(ethylene-butylene)-styrene thermoplastic elastomeric block copolymer blend.

Elastic nonwoven webs formed from blends containing the recited levels of additives had a lower elastic modulus (typically less than about 1.25), the elastic modulus was locally constant during elongation of the web up to about 250 percent, and the stress-strain hysteresis loop was generally flatter than the conventional styrene-poly(ethylene-butylene)-styrene blend as can be seen from FIGS. 2 through 4. In particular, an exemplary blend containing for example, 75.0 percent, by weight, styrene-poly(ethylene-propylene)-styrene-poly(ethylene-propylene) elastomeric block copolymer (molecular weight 63,000) available from the Shell Chemical Company; 20.0 percent, by weight, REGALREZ®1126 (hydrocarbon tackifying resin); and 5.0 percent, by weight, Drakeol 34 9mineral oil), was formed into a 73.3 gsm meltblown web. FIG. 2 is an exemplary stress-strain curve for nonwoven meltblown fiber web formed from that blend.

FIG. 3 is an exemplary stress-strain curve for a 81.6 gsm meltblown web formed from a blend composed of 75.4 percent, by weight, styrene-poly(ethylene-propylene)-styrene-poly(ethylene-propylene) elastomeric block copolymer (molecular weight 63,000) available from the Shell Chemical Company; 21.6 percent, by weight, REGALREZ® 1126 (hydrocarbon tackifying resin); and 3.0 percent, by weight, Drakeol 34 (mineral oil). FIG. 4 is an exemplary stress-strain curve for a 76.7 gsm meltblown web formed from a blend of about 63.0 percent, by weight, styrene-poly(ethylene-butylene)-styrene elastomeric block copolymer (KRATON® G-1657); 17 percent, by weight, REGALREZ® 1126; and 20 percent, by weight, Petrothene NA 601.

As shown above, while the extrudable elastomeric composition used to form the elastic sheet has been discussed in terms of a three or four-component extrudable composition of (1) styrene-poly(ethylene-propylene)-styrene-poly(ethylene-propylene) elastomeric polymer or mixture of styrene-poly(ethylene-propylene)-styrene-poly(ethylene-propylene) and styrene-poly(ethylene-butylene)-styrene elastomeric block copolymers; (2) polyolefin; (3) tackifying resin; and (4) extending oil; the polyolefin, which functions as a flow promoter for the composition can be substituted by other compatible flow promoters or processing aids, or can be eliminated altogether where the tackifying resin can also act as the flow promoter and/or extending oil. The extending oil and/or the polyolefin, which function as a processing aid, may also be substituted by other compatible processing aids or can be eliminated altogether where the tackifying resin can also act as the extending oil and/or polyolefin. For example, low molecular weight hydrocarbon resins such as REGALREZ® tackifier can also act as the viscosity reducer and/or the extending oil, whereby the extrudable composition may contain the elastomeric block copolymer(s) and the tackifying resin (e.g., REGALREZ® tackifier).

While the principal components of the blend have been described in the foregoing, such extrudable composition is not limited thereto, and can include other components not adversely affecting the composition attaining the stated objectives. The blend used to form the elastic nonwoven web may be mixed with other appropriate materials, such as, for example, pigments, antioxidants, stabilizers, surfactants, waxes, flow promoters, solvents, particulates and materials added to enhance processability of the composition prior to or after its introduction into the hopper 12.

Referring again to FIG. 1, the extruder 14 has an extrusion screw (not shown) which is driven by a conventional drive motor (not shown). As the elastic block copolymer advances through the extruder 14, due to rotation of the extrusion screw by the drive motor, it is progressively heated to a molten state. Heating of the elastic block copolymer to the molten state may be accomplished in a plurality of discrete steps with its temperature being gradually elevated as it advances through discrete heating zones of the extruder 14 toward a meltblowing die 16. The die 16 may be yet another heating zone where the temperature of the thermoplastic resin is maintained at an elevated level for extrusion. The temperature which will be required to heat the elastic block copolymer to a molten state will vary somewhat depending upon which grade of elastic block copolymer is utilized and can be readily determined by those in the art. However, generally speaking, the elastic block copolymer may be extruded within the temperature range of from about 450 degrees Fahrenheit to about 550 degrees Fahrenheit. For example, the extrusion may be accomplished within a temperature range of from about 475 degrees Fahrenheit to about 520 degrees Fahrenheit. Heating of the various zones of the extruder 14 and the meltblowing die 16 may be achieved by any of a variety of conventional heating arrangements (not shown).

Figure 5:
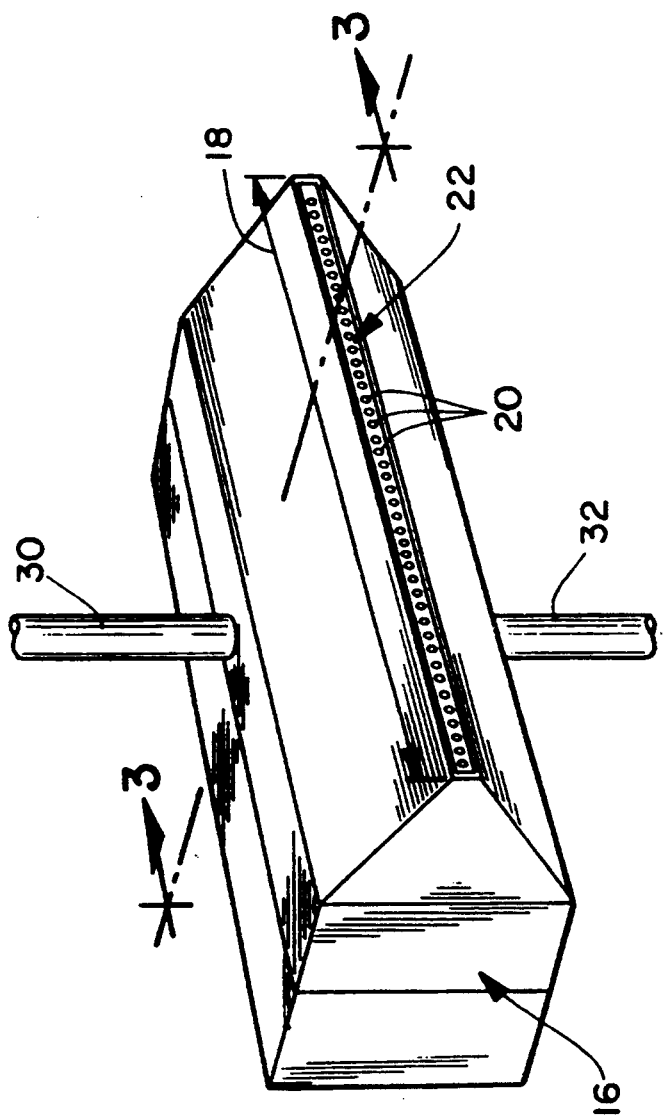
FIG. 5 is a bottom view of the die of FIG. 1 with the die having been rotated 90 degrees for clarity.

FIG. 5 illustrates that the lateral extent 18 of the die 16 is provided with a plurality of orifices 20 which are usually circular in cross-section and are linearly arranged along the extent 18 of the tip 22 of the die 16. The orifices 20 of the die 16 may have diameters that range from about 0.01 of an inch to about 0.02 of an inch and a length which may range from about 0.05 inches to about 0.20 inches. For example, the orifices may have a diameter of about 0.0145 inches and a length of about 0.113 inches. From about 5 to about 50 orifices may be provided per inch of the lateral extent 18 of the tip 22 of the die 16 with the die 16 extending from about 30 inches to about 60 inches or more. FIG. 1 illustrates that the molten elastic block copolymer emerges from the orifices 20 of the die 16 as molten strands or threads 24.

Figure 6:
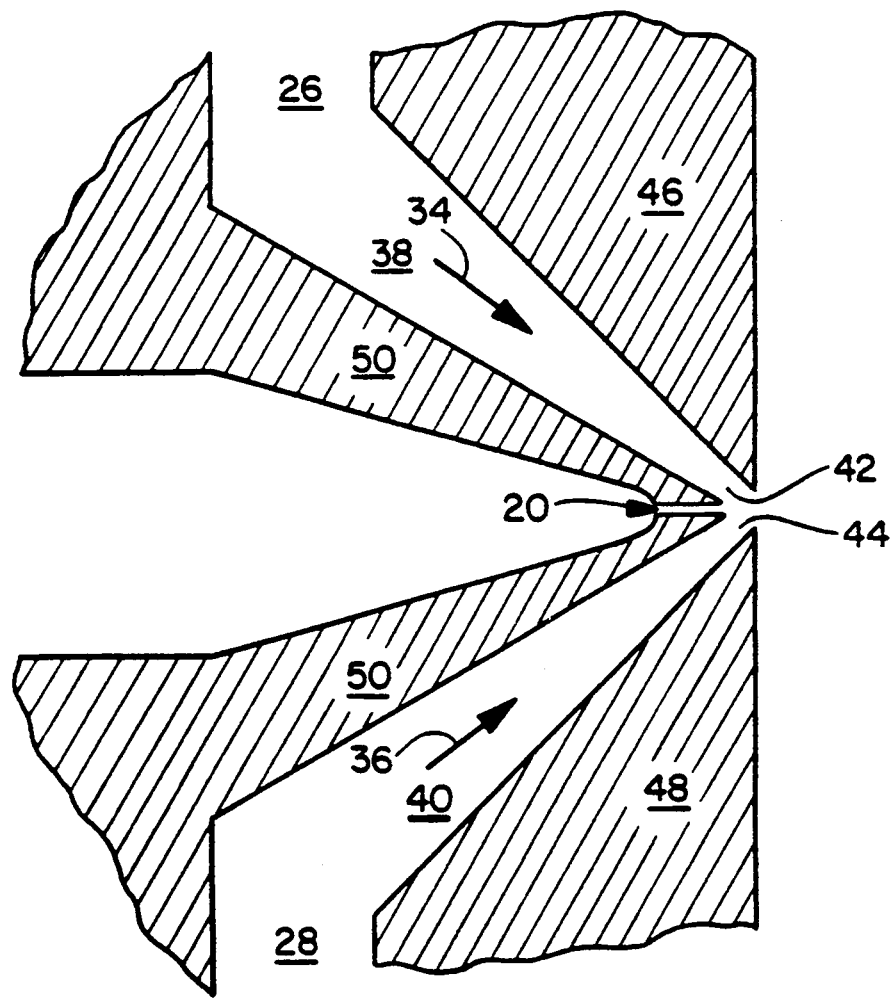
FIG. 6 is a cross-sectional view of the die of FIG. 1 taken along line 3—3 of FIG. 5.

FIG. 6, which is a cross-sectional view of the die of FIG. 5 taken along line 3—3, illustrates that the die 16 preferably includes attenuating gas inlets 26 and 28 which are provided with heated, pressurized attenuating gas (not shown) by attenuating gas sources 30 and 32. (See FIGS. 1 and 5). The heated, pressurized attenuating gas enters the die 16 at the inlets 26 and 28 and follows a path generally designated by the arrows 34 and 36 through the two chambers 38 and 40 and on through the two narrow passageways or gaps 42 and 44 so as to contact the extruded threads 24 as they exit the orifices 20 of the die 16. The chambers 38 and 40 are designed so that the heated attenuating gas passes through the chambers 38 and 40 and exits the gaps 42 and 44 to form a stream (not shown) of attenuating gas which exits the die 16 on both sides of the threads 24. The temperature and pressure of the heated stream of attenuating gas can vary widely. For example, the heated attenuating gas can be applied at a temperature of from about 470 degrees Fahrenheit to about 580 degrees Fahrenheit, more particularly, from about 500 degrees Centigrade to about 550 degrees Centigrade. The heated attenuating gas may generally be applied at a pressure of from about 0.5 pounds per square inch, gauge to about 20 pounds per square inch, gauge. More particularly, from about 1 pound per square inch, gauge to about 5 pounds per square inch, gauge.

The position of air plates 46 and 48 which, in conjunction with a die portion 50 define the chambers 38 and 40 and the gaps 42 and 44, may be adjusted relative to the die portion 50 to increase or decrease the width of the attenuating gas passageways 42 and 44 so that the volume of attenuating gas passing through the air passageways 42 and 44 during a given time period can be varied without varying the velocity of the attenuating gas. Furthermore, the air plates 46 and 48 may be adjusted to effect a "recessed" die-tip configuration as illustrated in FIG. 3 or a positive die-tip 22 stick-out where the tip of die portion 50 protrudes beyond the plane formed by the plates 48. Generally speaking, a positive die-tip stick-out configuration and attenuating gas pressures of less than 5 pounds per square inch, gauge are used in conjunction with air passageway widths, which are usually the same and are no greater in width than about 0.110 inches. Lower attenuating gas velocities and wider air passageway gaps are generally preferred if substantially continuous meltblown fibers or microfibers 24 are to be produced.

The two streams of attenuating gas converge to form a stream of gas which entrains and attenuates the molten threads 24, as they exit the orifices 20, into fibers or, depending upon the degree of attenuation, microfibers, of a small diameter which is usually less than the diameter of the orifices 20. The gas-borne fibers or microfibers 24 are blown, by the action of the attenuating gas, onto a collecting arrangement which, in the embodiment illustrated in FIG. 1, is a foraminous endless belt 52 conventionally driven by rollers 54. Other foraminous arrangements such as a rotating drum could be utilized. One or more vacuum boxes (not illustrated) may be located below the surface of the foraminous belt 52 and between the rollers 54. The fibers or microfibers 24 are collected as a coherent matrix of fibers on the surface of the endless belt 52 which is rotating as indicated by the arrow 58 in FIG. 1. The vacuum boxes assist in retention of the matrix on the surface of the belt 52. Typically the tip 22 of the die 16 is from about 6 inches to about 14 inches from the surface of the foraminous belt 52 upon which the fibers are collected. The thus-collected, entangled fibers or microfibers 24 are coherent and may be removed from the belt 52 as a self-supporting nonwoven web 56 by a pair of pinch rollers 60 and 62 which may be designed to press the fibers of the web 56 together to improve the integrity of the web 56.

The above-described meltblowing techniques, and apparatus are discussed fully in U.S. Pat. No. 4,663,220, the contents of which have been previously incorporated herein by reference. For example, a blend containing, by weight, 68.8, percent SEPSEP tetrablock copolymer (molecular weight 63,000) available from the Shell Chemical Company; 14.0 percent Petrothene NA 601 polyethylene; and 17.2 percent REGALREZ®1126 tackifying resin was meltblown with the blend heated to a temperature of 480° F. Generally, and intended to be illustrative and not limiting, the following described parameters can be used for meltblowing the polymer blends to form the elastic nonwoven webs of the present invention. Thus, the blends can be meltblown while at a temperature of 450° to 550° F., preferably 475° to 500° F., during the meltblowing. The primary air temperature, during the meltblowing, can be 475° to 525° F., preferably 500° to 520° F.; and the primary air pressure can be 1.5–8 pounds per square inch (psi) gauge, preferably 2–4 psi gauge.

Figure 7:
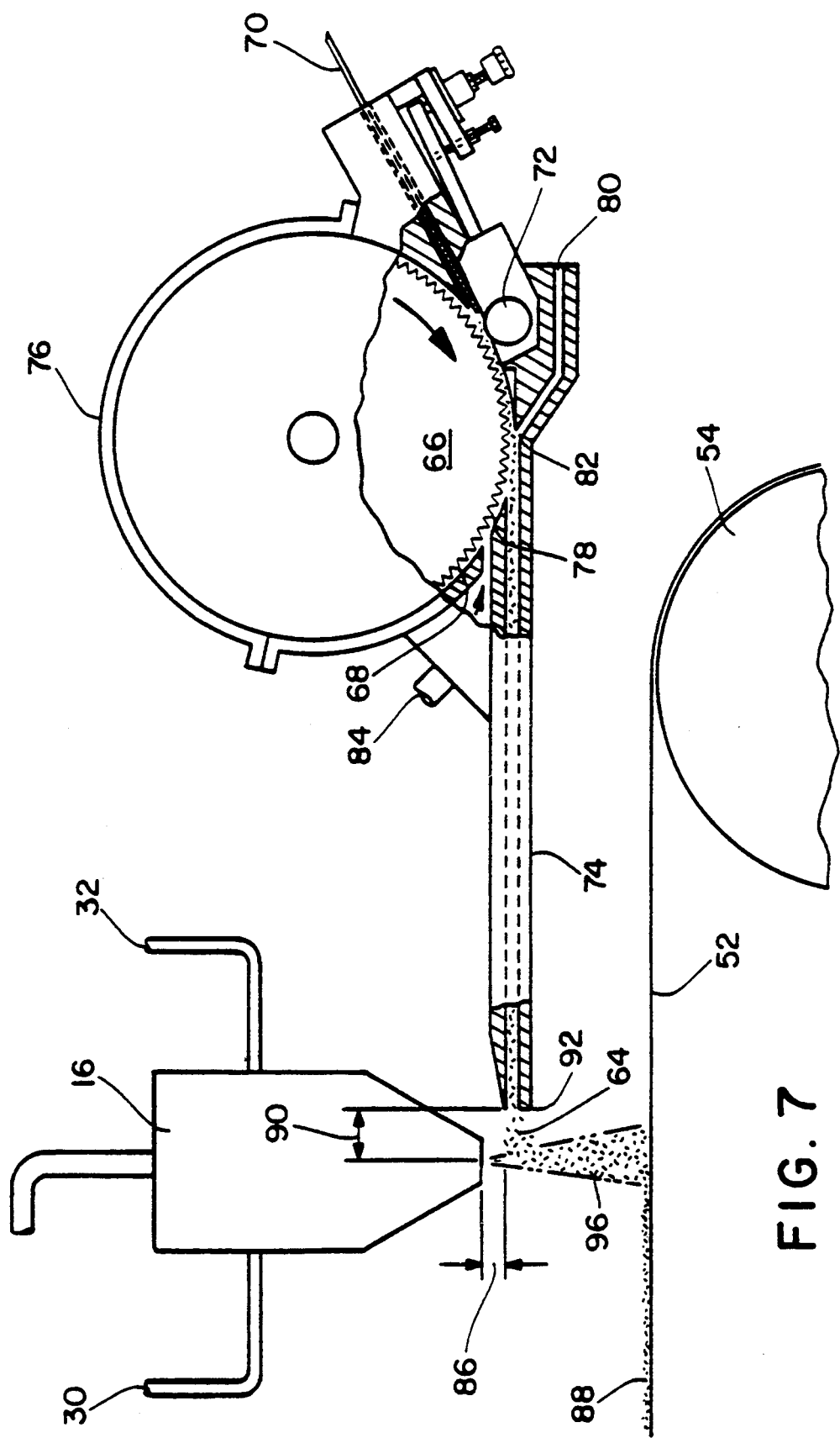
FIG. 7 is a schematic illustration of an apparatus which may be utilized to form the embodiment of the present invention where nonelastic fibers are incorporated into the matrix of meltblown fibers.

FIG. 7 illustrates another embodiment of the present invention where one or more types of nonelastic fibers 64 are distributed within or upon the stream of thermoplastic fibers or microfibers 24. Distribution of the nonelastic fibers 64 within the stream of fibers 24 may be such that the nonelastic fibers 64 are generally uniformly distributed throughout the stream of elastic block copolymer fibers 24. This may be accomplished by merging a secondary gas stream (not shown) containing the nonelastic fibers 64 with the stream of fibers 24. Apparatus for accomplishing this merger may include a conventional picker roll 66 arrangement which has a plurality of teeth 68 that are adapted to separate a mat or batt 70 of nonelastic fibers into the individual nonelastic fibers 64. The mat or batt of fibers 70 which is fed to the picker roll 66 may be a sheet of pulp fibers (if a two component mixture of elastomeric block copolymer fibers and pulp fibers is desired), a mat of staple fibers (if a two component mixture of elastomeric block copolymer fibers and staple fibers is desired) or both a sheet of pulp fibers and a mat of staple fibers (if a three component mixture of elastomeric block copolymer fibers, staple fibers and pulp fibers is desired). In embodiments where, for example, an absorbent material is desired, the nonelastic fibers 64 are absorbent fibers. The nonelastic fibers 64 may generally be selected from the group including one or more polyester fibers, polyamide fibers, polyolefin fibers such as, for example, polyethylene fibers and polypropylene fibers, cellulosic derived fibers such as, for example, rayon fibers and wood pulp fibers, multi-component fibers such as, for example, sheath-core multi-component fibers or side-by-side multi-component fibers, natural fibers such as silk fibers, wool fibers or cotton fibers or electrically conductive fibers or blends of two or more of such fibers. Other types of nonelastic fibers 64 as well as blends of two or more of other types of fibers 64 may be utilized. The nonelastic fibers 64 may be microfibers or the nonelastic fibers 64 may be macrofibers having an average diameter of from about 300 microns to about 1,000 microns.

The sheets or mats 70 of nonelastic fibers 64 are fed to the picker roll 66 by a roller arrangement 72. After the teeth 68 of the picker roll 66 have separated the mat of nonelastic fibers 70 into separate nonelastic fibers 64 the individual nonelastic fibers 64 are conveyed toward the stream of elastic block copolymer fibers or microfibers 24 through a nozzle 74. A housing 76 encloses the picker roll 66 and provides a passageway or gap 78 between the housing 76 and the surface of the teeth 68 of the picker roll 66. A gas (not shown), for example air, is supplied to the passageway or gap 78 between the surface of the picker roll 66 and the housing 76 by way of a gas duct 80. The gas duct 80 may enter the passageway or gap 78 generally at the junction 82 of the nozzle 74 and the gap 78. The gas is supplied in sufficient quantity to serve as a medium for conveying the nonelastic fibers 64 through the nozzle 74. The gas supplied from the duct 80 also serves as an aid in removing the nonelastic fibers 64 from the teeth 68 of the picker roll 66. However, gas supplied through the duct 84 generally provides for the removal of the nonelastic fibers 64 from the teeth of the picker roll 66. The gas may be supplied by any conventional arrangement such as, for example, an air blower (not shown).

Generally speaking, the individual nonelastic fibers 64 are conveyed through the nozzle 74 at generally the velocity at which the nonelastic fibers 64 leave the teeth 68 of the picker roll 66. In other words, the nonelastic fibers 64, upon leaving the teeth 68 of the picker roll 66 and entering the nozzle 74, generally maintain their velocity in both magnitude and direction from the point where they left the teeth 68 of the picker roll 66. Such an arrangement, which is discussed in more detail in U.S. Pat. No. 4,100,324 to Anderson et al., hereby incorporated by reference, aids in substantially reducing fiber floccing.

As an aid in maintaining satisfactory nonelastic fiber 64 velocity, the nozzle 74 may be positioned so that its longitudinal axis is substantially parallel to a plane which is tangent to the picker roll 66 at the junction 82 of the nozzle 74 with the passageway 78. As a result of this configuration, the velocity of the nonelastic fibers 64 is not substantially changed by contact of the nonelastic fibers 64 with the walls of the nozzle 74. If the nonelastic fibers 64 temporarily remain in contact with the teeth 68 of the picker roll 66 after they have been separated from the mat or batt 70, the axis of the nozzle 74 may be adjusted appropriately to be aligned with the direction of nonelastic fiber 64 velocity at the point where the nonelastic fibers 64 disengage from the teeth 68 of the picker roll 66. The disengagement of the nonelastic fibers 64 from the teeth 68 of the picker roll 66 may be assisted by application of a pressurized gas, i.e., air through duct 84.

The vertical distance 86 that the nozzle 74 is below the die tip 22 may be adjusted to vary the properties of the composite web 88. Variation of the horizontal distance 90 of the tip 92 of the nozzle 74 from the die tip 22 will also achieve variations in the final elastic nonwoven web 88. The vertical distance 86 and the horizontal distance 90 values will also vary with the material being added to the elastomeric block copolymer fibers 24. The width of the nozzle 74 along the picker roll 66 and the length that the nozzle 74 extends from the picker roll 66 are also important in obtaining optimum distribution of the nonelastic fibers 64 throughout the stream of fibers 24. It is usually desirable for the length of the nozzle 74 to be as short as equipment design will allow. The length is usually limited to a minimum length which is generally equal to the radius of the picker roll 66. Usually, the width of the nozzle 74 should not exceed the width of the sheets or mats 70 that are being fed to the picker roll 66.

The picker roll 66 may be replaced by a conventional particulate injection system to form a composite nonwoven web 88 containing various particulates. A combination of both particulates and nonelastic fibers could be added to the elastic block copolymer fibers prior to formation of the composite nonwoven web 88 if a conventional particulate injection system was added to the system illustrated in FIG. 4. FIG. 4 further illustrates that the gas stream carrying the nonelastic fibers 64 is moving in a direction which is generally perpendicular to the direction of movement of the stream of elastic block copolymer fibers 24 at the point of merger of the two streams. Other angles of merger of the two streams may be utilized. The velocity of the gas stream of nonelastic fibers 64 is usually adjusted so that it is less than the velocity of the stream of elastomeric block copolymer fibers 24. This allows the streams, upon merger and integration thereof to flow in substantially the same direction as that of the stream of elastomeric block copolymer fibers 24. Indeed, the merger of the two streams may be accomplished in a manner which is somewhat like an aspirating effect where the stream of nonelastic fibers 64 is drawn into the stream of elastomeric block copolymer fibers 24. If desired the velocity difference between the two gas streams may be such that the nonelastic fibers 64 are integrated into the elastomeric block copolymer fibers 24 in a turbulent manner so that the nonelastic fibers 64 become substantially thoroughly and uniformly mixed throughout the elastomeric block copolymer fibers 24. Generally, for increased production rates the gas stream which entrains and attenuates the stream of elastomeric block copolymer fibers 24 should have a comparatively high initial velocity, for example from about 200 feet to over 1,000 feet per second, and the stream of gas which carries the nonelastic fibers 64 should have a comparatively low initial velocity, for example from about 50 to about 200 feet per second. After the stream of gas that entrains and attenuates the elastomeric block copolymer fibers 24 exits the gaps 42 and 44 of the die 16, it immediately expands and decreases in velocity.

Upon merger and integration of the stream of nonelastic fibers 64 into the stream of elastomeric block copolymer fibers 24 to generally uniformly distribute the nonelastic fibers 64 throughout the stream of elastomeric block copolymer fibers 24, a composite stream 96 of thermoplastic fibers 22 and nonelastic fibers 64 is formed. Due to the fact that the elastomeric block copolymer fibers 24 are usually still semi-molten and tacky at the time of incorporation of the nonelastic fibers 64 into the elastomeric block copolymer fibers 24, the nonelastic fibers 64 are usually not only mechanically entangled within the matrix formed by the elastomeric block copolymer fibers 24 but are also thermally bonded or joined to the elastomeric block copolymer fibers 24. In order to convert the composite stream 96 of elastomeric block copolymer fibers 24 and nonelastic fibers 64 into a composite elastic nonwoven web or mat 88 composed of a coherent matrix of the elastomeric block copolymer fibers 24 having the nonelastic fibers 64 generally uniformly distributed therein, a collecting device is located in the path of the composite stream 96. The collecting device may be the endless belt 52 of FIG. 4 upon which the composite stream 96 impacts to form the composite nonwoven web 56. The belt 52 is usually porous and a conventional vacuum arrangement (not shown) which assists in retaining the composite stream 96 on the external surface of the belt 52 is usually present. Other collecting devices are well known to those of skill in the art and may be utilized in place of the endless belt 52. For example, a porous rotating drum arrangement could be utilized. Thereafter, the composite elastic nonwoven web 88 is removed from the screen by the action of rollers such as roller 60 and 62 shown in FIG. 1.

In one aspect of the present invention, an elastic fibrous web may be incorporated into a composite elastic material. Generally speaking, a composite elastic material is a multilayer material having at least one elastic layer joined to at least one gatherable layer at least at two locations in which the gatherable layer is gathered between the locations where it is joined to the elastic layer. A composite elastic material may be stretched to the extent that the nonelastic material gathered between the bond locations allows the elastic material to elongate. This type of composite elastic material is disclosed, for example, by U.S. Pat. No. 4,720,415 to Vander Wielen et al., issued Jan. 19, 1988, which is hereby incorporated by reference.

One type of a composite elastic material is referred to as a stretch-bonded laminate. Such a laminate may be made as generally described in U.S. Pat. No. 4,720,415. For example, an elastomeric fabric can be unwound from a supply roll and passed through a nip of an S-roll arrangement. The elastic fabric may also be formed in-line and passed directly through the nip without first being stored on a supply roll.

The elastic web is passed through the nip of the S-roll arrangement in a reverse-S path. From the S-roll arrangement, the elastic web passes through the pressure nip formed by a bonder roller arrangement. Additional S-roll arrangements (not shown) may be introduced between the S-roll arrangement and the bonder roller arrangement to stabilize the stretched material and to control the amount of stretching. Because the peripheral linear speed of the rollers of the S-roll arrangement is controlled to be less than the peripheral linear speed of the rollers of the bonder roller arrangement, the elastic web is tensioned between the S-roll arrangement and the pressure nip of the bonder roll arrangement. By adjusting the difference in the speeds of the rollers, the elastic web is tensioned so that it stretches a desired amount and is maintained in such stretched condition Simultaneously, a first and second gatherable layer is unwound from a supply roll and passed through the nip of the bonder roller arrangement. It is contemplated that the first gatherable layer and/or the second gatherable layer may be formed in-line by extrusion processes such as, for example, meltblowing processes, spunbonding processes or film extrusion processes and passed directly through the nip without first being stored on a supply roll.

The first gatherable layer and second gatherable layer are joined to the elastic web (while the web is maintained in its elongated condition) during their passage through the bonder roller arrangement to form a composite elastic material (i.e., stretch-bonded laminate).

The stretch-bonded laminate immediately relaxes upon release of the tensioning force provided by the S-roll arrangement and the bonder roll arrangement, whereby the first gatherable layer and the second gatherable layer are gathered in the stretch-bonded laminate. The stretch-bonded laminate is then wound up on a winder.

EXAMPLE I

A fibrous nonwoven elastic web was formed by meltblowing a blend of approximately 75.0 percent, by weight, styrene-poly(ethylene-propylene)-styrene-poly(ethylene-propylene) elastic tetrablock copolymer (molecular weight 63,000) obtained from the Shell Chemical Company, 20.0 percent, by weight, REGALREZ®1126 tackifying resin, and 5.0 percent, by weight, Drakeol 34 mineral oil. The blend had a melt flow rate of about 7 to about 8 grams per 10 minutes. The melt flow rate of the blend was determined in accordance with ASTM D1238 at 190° C. under a 2160 gram load over a 10 minute period.

Meltblowing of the blend was accomplished by extruding the blend through a meltblowing die having 30 extrusion capillaries per lineal inch of die tip. The capillaries each had a diameter of about (0.0197 inches) and a length of about (0.113 inches). The elastic blend was passed through the capillaries at a rate of about 0.55 grams per capillary per minute at a temperature of about 480 degrees Fahrenheit. The extrusion pressure exerted upon the molten blend in the die tip was measured as 395 pounds per square inch, gauge. The die tip configuration was adjusted so that it had a positive die tip stickout of about (0.008) inches from the plane of the external surface of the lips of the air plates which form the air passageways on either side of the capillaries. The air plates were adjusted so that the two air passageways, one on each side of the extrusion capillaries, formed air passageways of a width or gap of about (0.060 inches). Forming air for meltblowing the blend was supplied to the air passageways at a temperature of about 490 degrees Fahrenheit and at a pressure of about 2.0 pounds per square inch, gauge. The meltblown fibers thus formed were blown onto a forming screen which was approximately 12 inches from the die tip. The meltblown fibers were collected on the forming screen into a coherent nonwoven web having a basis weight of approximately 73.3 grams per square meter (gsm). for Examples 2-6 were conducted in accordance with Example 1. Extrudable blends for those examples were prepared by blending varying amounts of a styrene-poly(ethylene-propylene)-styrene-poly(ethylene-propylene) elastomeric block copolymer (molecular weight 63,000) available from the Shell Chemical Company, a polyolefin (Petrothane NA 601 polyethylene), a tackifying resin (REGALREZ®1126 hydrocarbon resin), and an extending oil (Drakeol 34 white mineral oil). The amount of each component is expressed in weight percent in Table 2 for each extrudable elastomeric composition. Additives which are present only in small amounts such as, for example, antioxidant are not shown in the formulations of Table 2. Example 7 was conducted in accordance with Examples 1-6 except that the meltblown web was formed from a blend including a tri-block copolymer (i.e., styrene-poly(ethylene-butylene)-styrene elastomeric block copolymer) available from the Shell Chemical Company under the designation KRATON® G-1657, Petrothene NA 601 polyethylene; and REGALREZ® 1126 tackifying resin.

TABLE 2

| | Example | | | | | |
|---|---|---|---|---|---|---|
| | 2 | 3 | 4 | 5 | 6 | 7 |
| Styrene-poly(ethylene-propylene)-tetrablock copolymer | 75.4 | 80.0 | 65.0 | 67.5 | 68.8 | 0 |
| KRATON ® G-1657 | 0 | 0 | 0 | 0 | 0 | 63.0 |
| polyolefin | 0 | 0 | 0 | 5.0 | 14.0 | 20.0 |
| tackifying resin | 21.6 | 20.0 | 26.0 | 23.5 | 17.2 | 17.0 |
| extending oil | 3.0 | 0 | 9.0 | 4.0 | 0 | 0 |

All of the meltblown webs were prepared using a meltblowing die which had 30 extrusion capillaries per lineal inch of die tip. The capillaries of the meltblowing die each had a diameter of about (0.0197 inches) and a length of about (0.113 inches). The various process parameters of Examples 2-7 are detailed in Table 3.

TABLE 3

| | Example | | | | | |
|---|---|---|---|---|---|---|
| | 2 | 3 | 4 | 5 | 6 | 7 |
| Melt Flow Rate[1] | 7-8 | 3-4 | 25 | 14 | — | 11 |
| Extrusion Rate[2] | 0.55 | 0.33 | 0.55 | 0.55 | 0.55 | 0.55 |
| Extrusion Die Temperature[3] | 480 | 480 | 480 | 480 | 480 | 480 |
| Extrusion Die Pressure[4] | 414 | 425 | 220 | 276 | 383 | 350 |
| Die Tip Stick-Out[5] | 0.008 | 0.008 | 0.008 | 0.008 | 0.008 | 0.008 |
| Air Passageway Gap[6] | 0.060 | 0.060 | 0.060 | 0.060 | 0.060 | 0.060 |
| Air Temperature[7] | 490 | 490 | 490 | 490 | 490 | 490 |
| Air Pressure[8] | 2.0 | 2.0 | 2.0 | 2.0 | 2.0 | 2.0 |
| Distance: Die-Tip to Forming Screen[9] | 12 | 12 | 12 | 12 | 12 | 12 |

[1] in grams per 10 minutes (supplied by the Shell Chemical Company, reported values have been extrapolated utilizing linear regression techniques).
[2] in grams per capillary per minute
[3] in degrees Fahrenheit
[4] in pounds per square inch, gauge in the die tip cavity
[5] in inches (negative values indicate recessed die tip arrangement)
[6] in inches
[7] in degrees Fahrenheit
[8] in pounds per square inch, gauge
[9] in inches

TENSILE TEST AND CYCLING DATA

The meltblown webs produced in Examples 1-7 were tested to determine the tensile properties of those materials. The results of the tests are reported in Table 4. The meltblown webs were tested on a Sintech 2 computerized material testing system available from Sintech, Incorporated of Stoughton, Massachusetts. Sample size was about 1 inch by 6 inches (the 6 inch dimension was in the machine direction), gauge length was 100 mm (about 4 inches), stop load was set at 2000 grams, and the crosshead speed was about 500 millimeters per minute. Measurements were taken of the load at 100% elongation (i.e., 200% of the material's initial length) and 250% elongation (i.e., 350% of the material's initial length) during the load portion of the first cycle and the load at 100% elongation during the unload portion of the cycle. The measurements were repeated at 100% elongation and 250% elongation during the load portion of the second cycle and at 100% elongation during the unload portion of the second cycle. The sample was then extended to 300% elongation (i.e., 400% of the material's initial length) at 500 millimeters per minute and the load was measured (a) upon reaching 300% elongation, (b) after being held at 300% elongation for 1 minute and (c) after being held at 300% elongation for 20 minutes. The difference between the initial load measured after 300% elongation and the load measured at 300% elongation for 20 minutes was determined. The 1st extension slope (extension from 100% to 250% elongation) was determined utilizing the following equation:

$$\text{1st Extension Slope} = (\text{load}_{250\%} - \text{load}_{100\%})/(\text{length}_{250\%} - \text{length}_{100\%})$$

TABLE 4

| Sample | 1" × 6" Basis Weight (gsm) | Load @ 100% Extension | Load @ 250% Extension | 1st Ext. Slope 100%–250% | Unload @ 100% Extension | Load @ 100% 2nd Cycle | Load @ 250% 2nd Cycle |
|---|---|---|---|---|---|---|---|
| 1 | 73.3 | 63.0 | 110.1 | 7.9 | 45.9 | 49.6 | 104.5 |
| 2 | 81.6 | 72.1 | 125.5 | 8.9 | 52.9 | 57.0 | 118.4 |
| 3 | 78.9 | 76.2 | 123.2 | 7.8 | 46.6 | 52.6 | 115.3 |
| 4 | 104.9 | 79.0 | 143.3 | 10.7 | 64.3 | 68.4 | 136.9 |
| 5 | 95.1 | 95.6 | 168.1 | 12.1 | 66.9 | 74.3 | 159.6 |
| 6 | 86.5 | 114.7 | 181.0 | 11.1 | 51.8 | 64.2 | 169.1 |
| 7 | 76.7 | 115.0 | 170.8 | 9.3 | 38.0 | 56.0 | 160.0 |

| Sample | Unload @ 100% 2nd Cycle | Load @ 300% Ext. T = 0 | Load @ 300% Ext. T = 1 Min. | Load @ 300% Ext. T = 20 Min. | % Diff 0–20 Min. | 1st Cycle @ 100% Ext. Divided by MBBW (gsm) |
|---|---|---|---|---|---|---|
| 1 | 44.1 | 120.2 | 108.6 | 89.7 | 25 | 0.86 |
| 2 | 49.5 | 136.3 | 122.5 | 103.5 | 24 | 0.88 |
| 3 | 43.2 | 131.3 | 112.7 | 95.2 | 28 | 0.97 |

TABLE 4-continued

| | | | | | | |
|---|---|---|---|---|---|---|
| 4 | 61.6 | 160.0 | 146.6 | 118.7 | 26 | 0.78 |
| 5 | 63.9 | 186.4 | 166.3 | 139.1 | 25 | 1.01 |
| 6 | 49.2 | 193.7 | 163.5 | 135.9 | 30 | 1.33 |
| 7 | 36.5 | 185.7 | 148.5 | 119.8 | 35 | 1.50 |

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. An elastic nonwoven web comprising a coherent matrix of fibers formed from an extrudable blend comprising:
   an elastomeric A-B-A-B tetrablock copolymer where A is a thermoplastic polymer block and where B is an isoprene monomer hydrogenated to substantially a poly(ethylene-propylene) monomer unit; wherein the web is adapted to have an elastic modulus of less than about 1.25 which is locally constant during elongation of the web up to about 250 percent.

2. The elastic nonwoven web of claim 1 wherein the web is adapted to have an elastic modulus of less than about 1 which is locally constant during elongation of the web up to about 250 percent.

3. The elastic nonwoven web of claim 1, wherein the elastomeric A-B-A-B tetrablock copolymer has the formula:

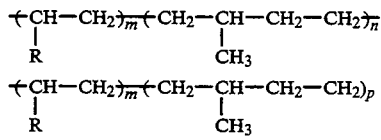

wherein m is an integer from about 40 to 75; and n is an integer from about 500 to 1000; p is an integer from about 75 to 125; and R is a phenyl group.

4. The elastic nonwoven web of claim 1 wherein the elastomeric A-B-A-B tetrablock copolymer has an average molecular weight of from about 48,000 to about 94,000 and a weight ratio of polystyrene endblocks to poly(ethylene-propylene) midblocks and endblocks of from about 10:90 to about 25:75.

5. The elastic nonwoven web of claim 1, wherein the extrudable blend further comprises a tackifying resin selected from the group including hydrogenated hydrocarbon resins and terpene hydrocarbon resins.

6. The elastic nonwoven web of claim 1, wherein the blend further includes a polyolefin.

7. The elastic nonwoven web of claim 6, wherein the polyolefin is selected from the group including polyethylene, polypropylene, polybutylene, polyethylene copolymers, polypropylene copolymers, polybutylene copolymers and mixtures thereof.

8. The elastic nonwoven web of claim 1, wherein the blend further includes an extending oil.

9. The elastic nonwoven web of claim 1, wherein said blend comprises from about 50 to about 80 percent, by weight, of an elastomeric A-B-A-B tetrablock copolymer, from about 15 to about 28 percent, by weight, of a tackifying resin, from about 3 to about 23 percent, by weight, of a polyolefin, and from about 0 to about 15 percent, by weight, of an extending oil.

10. The elastic nonwoven web of claim 1, wherein the fibers are meltblown fibers.

11. The elastic nonwoven web of claim 10, wherein the meltblown fibers include microfibers.

12. A composite elastic material comprising:
   an elastic nonwoven web according to claim 1; and
   at least one gatherable layer joined at spaced-apart locations to the elastic web so that the gatherable layer is gathered between the spaced-apart locations.

13. The composite elastic material of claim 12 wherein the gatherable layer is a nonwoven web of fibers.

14. The composite elastic material of claim 13 wherein the gatherable layer is selected from the group consisting of a web of spunbonded fibers, a web of meltblown fibers, a bonded carded web of fibers, a multi-layer material including at least one of the webs of spunbonded fibers, meltblown fibers, and a bonded carded web of fibers.

15. The composite elastic material of claim 13 wherein the gatherable layer is a composite material comprising a mixture of fibers and one or more other materials selected from the group consisting of wood pulp, staple fibers, particulates and super-absorbent materials.

16. A coformed elastic nonwoven web comprising:
   a coherent matrix of elastic fibers formed from a blend including:
   an elastomeric A-B-A-B tetrablock copolymer where A is a thermoplastic polymer block and where B is an isoprene monomer unit hydrogenated to substantially a poly(ethylene-propylene) monomer unit; a tackifying resin, and
   at least one other material selected from the group consisting of nonelastic fibers and particulates; and wherein said web has an elastic modulus of less than about 1.25 which is locally constant during elongation of the web up to about 250 percent.

17. The elastic nonwoven web of claim 16 wherein the web is adapted to have an elastic modulus of less than about 1 which is locally constant during elongation of the web up to about 250 percent.

18. The coformed elastic nonwoven web of claim 16, wherein the elastic fibers are meltblown fibers.

19. The coformed elastic nonwoven web of claim 18, wherein the meltblown fibers include microfibers.

20. The coformed elastic nonwoven web of claim 16 comprising from about 20 percent, by weight, to about 99 percent, by weight, of the elastic fibers and from about 1 percent, by weight, to about 80 percent, by weight, of the other materials.

21. The coformed elastic nonwoven web of claim 16, wherein the nonelastic fibers are selected from the group consisting of polyester fibers, polyamide fibers, glass fibers, polyolefin fibers, cellulosic derived fibers, multi-component fibers, natural fibers, absorbent fibers, electrically conductive fibers or blends of two or more of said nonelastic fibers.

22. The coformed elastic nonwoven web of claim 16, wherein the particulate materials are selected from the group consisting of activated charcoal and superabsorbents.

23. A composite elastic material comprising:
a coformed elastic nonwoven web according to claim 16; and
at least one gatherable layer joined at spaced-apart locations to the coformed elastic web so that the gatherable layer is gathered between the spaced-apart locations.

24. A composite elastic material comprising:
at least one elastic sheet formed from a blend comprising:
an elastomeric A-B-A-B tetrablock copolymer where A is a thermoplastic polymer block and where B is an isoprene monomer unit hydrogenated to substantially a poly(ethylene-propylene) monomer unit; and
a tackifying resin; wherein the elastic sheet is adapted to have an elastic modulus of less than about 1.25 which is locally constant during elongation of the web up to about 250 percent; and
at least one gatherable layer joined at spaced apart locations to the elastic sheet, and
wherein the gatherable layer is gathered between the spaced-apart locations.

* * * * *

UNITED STATES PATENT AND TRADEMARK OFFICE
CERTIFICATE OF CORRECTION

PATENT NO. : 5,332,613

DATED : July 26, 1994

INVENTOR(S) : Jack D. Taylor
Jon E. Tinsley

It is certified that error appears in the above-indentified patent and that said Letters Patent is hereby corrected as shown below:

Column 3, line 52, "Ser. No. 779,929..." should read --Ser. No. 07/779,929...--;

Column 4, line 4-5, delete "for example, 10 minutes at a specified temperature such as."

Column 4, line 16, "4 hours ,and holding.." should read --4 hours and holding...--;

Column 4, line 57, "needs hy providing" should read --needs by providing--;

Column 4, line 67 "(at 100 percent lelongation)" should read --(at 100 percent elongation)--;

Column 10, line 17, "(pure)(50% in heptane);" should read --(pure) of 2; a color (approximate Gardner color equal to 1)--(50% in heptane)--;

UNITED STATES PATENT AND TRADEMARK OFFICE
CERTIFICATE OF CORRECTION

PATENT NO. : 5,332,613
DATED : July 26, 1994
INVENTOR(S) : Jack D. Taylor
Jon E. Tinsley It is certified that error appears in the above-indentified patent and that said Letters Patent is hereby corrected as shown below:

Column 11, line 40, "Drakeol 34 9 mineral oil)," should read --Drakeol 34 (mineral oil),--;

Column 18, line 48, "meter (gsm). for Examples" should read --meter (gsm). <new paragraph> Examples...--;

Column 20, table 3, "1","2","3","4","5","6","7", "8", and "9", should be followed by an -- = --.

Signed and Sealed this

Thirty-first Day of October 1995

Attest:

BRUCE LEHMAN

*Attesting Officer*    *Commissioner of Patents and Trademarks*